(12) United States Patent
Disch et al.

(10) Patent No.: US 10,433,703 B2
(45) Date of Patent: Oct. 8, 2019

(54) CONVEYOR WARE WASHER, IN PARTICULAR INDUSTRIAL CONVEYOR WARE WASHER

(71) Applicants: Harald Disch, Elzach (DE); Martin Schrempp, Gengenbach (DE)

(72) Inventors: Harald Disch, Elzach (DE); Martin Schrempp, Gengenbach (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 200 days.

(21) Appl. No.: 15/039,858

(22) PCT Filed: Nov. 20, 2014

(86) PCT No.: PCT/US2014/066508
§ 371 (c)(1),
(2) Date: May 27, 2016

(87) PCT Pub. No.: WO2015/080928
PCT Pub. Date: Jun. 4, 2015

(65) Prior Publication Data
US 2017/0000310 A1  Jan. 5, 2017

(30) Foreign Application Priority Data

Nov. 28, 2013 (DE) ........................ 10 2013 224 440

(51) Int. Cl.
*A47L 15/42* (2006.01)
*A47L 15/00* (2006.01)
(Continued)

(52) U.S. Cl.
CPC ....... *A47L 15/4291* (2013.01); *A47L 15/0005* (2013.01); *A47L 15/24* (2013.01);
(Continued)

(58) Field of Classification Search
CPC ............................................. A47L 15/24–246
See application file for complete search history.

(56) References Cited

U.S. PATENT DOCUMENTS 3,986,345 A  10/1976  Pilz et al.

FOREIGN PATENT DOCUMENTS

DE  24 57 182 C2  9/1983
DE  30 19 922 C2  9/1989
(Continued)

OTHER PUBLICATIONS

Machine Translation EP2617343A1 (Year: 2013).*
(Continued)

*Primary Examiner* — Spencer E Bell
(74) *Attorney, Agent, or Firm* — Thompson Hine LLP (57) ABSTRACT

A conveyor ware washer (1), having a conveying device for conveying wash ware through treatment zones, has at least two wash zones (11, 12, 13), arranged one after the other and at least one final rinse zone (14) arranged downstream of the wash zones. An exhaust air system (20) removes exhaust air from the conveyor ware washer. The wash zone which is arranged closer to the final rinse zone has a heating device (40) for heating the wash liquid, which is to be sprayed in the relevant wash zone, to a minimum process temperature. A heat pump system transmits at least part of the thermal energy of the exhaust air, which has been removed or is to be removed from the conveyor ware washer, as useful heat to the wash liquid of the wash zone which is arranged further away from the at least one final rinse zone.

13 Claims, 2 Drawing Sheets

(51) Int. Cl.
*A47L 15/24* (2006.01)
*A47L 15/48* (2006.01)
*F25B 30/06* (2006.01)

(52) U.S. Cl.
CPC ............. *A47L 15/241* (2013.01); *A47L 15/48* (2013.01); *F25B 30/06* (2013.01); *A47L 2501/06* (2013.01); *Y02B 30/52* (2013.01)

(56) References Cited

FOREIGN PATENT DOCUMENTS

| DE | 20 2005 013 348 U1 | 11/2005 |
| DE | 10 2008 026 887 A1 | 12/2009 |
| DE | 10 2009 049 343 A1 | 4/2011 |
| DE | 10 2010 053 051 A1 | 6/2012 |
| EP | 2 215 953 A1 | 8/2010 |
| EP | 2 617 343 A1 | 7/2013 |

OTHER PUBLICATIONS

PCT, International Search Report and Written Opinion, International Application No. PCT/US2014/066508, dated Feb. 13, 2015.
PCT, International Preliminary Report on Patentability, International Application No. PCT/US2014/066508; dated Jun. 9, 2016, 7 pages.

* cited by examiner

CONVEYOR WARE WASHER, IN PARTICULAR INDUSTRIAL CONVEYOR WARE WASHER

CROSS-REFERENCE TO RELATED APPLICATIONS

This application is a National Stage filing of International Application No. PCT/US2014/066508, filed Nov. 20, 2014, which claims priority of German Patent Application No. 10 2013 224 440.1, filed Nov. 28, 2013, which are incorporated herein by reference in their entireties.

The present invention relates to a conveyor ware washer, in particular an industrial conveyor ware washer having at least two wash zones and a downstream final-rinse zone.

Accordingly, the invention relates in particular to a conveyor ware washer having a conveying device for conveying wash ware through the individual treatment zones of the conveyor ware washer. The conveyor ware washer has at least two wash zones, which are arranged one after the other when viewed in the conveying direction of the wash ware and in which, in each case, wash liquid from a wash tank which is associated with one of the relevant washing zones is sprayed onto the wash ware. In addition to the at least two wash zones which are arranged one after the other, the conveyor ware washer according to the invention has at least one final rinse zone which, when viewed in the conveying direction of the wash ware, is arranged downstream of the at least two wash zones, in which final rinse zone fresh water or final rinse liquid, is sprayed onto the wash ware. The conveyor ware washer according to the invention is additionally provided with an exhaust air system in order to remove exhaust air from the conveyor during the operation of the conveyor ware washer.

A conveyor ware washer according to the present invention is, in particular, a flight-type ware washer or a rack conveyor ware washer.

A conveyor ware washer of the type mentioned in the introduction is known, in principle, from the prior art and is usually used in the industrial sector. Contrary to so-called automated programs where the wash ware to be cleaned remains stationary in the machine during cleaning, in the case of conveyor ware washers wash ware is conveyed through different treatment zones of the conveyor ware washer.

A conveyor ware washer usually comprises at least one pre-wash zone and at least one main wash zone which, when viewed in the conveying direction of the wash ware, is arranged downstream of the pre-wash zone/zones. When viewed in the conveying direction, as a rule at least one final rinse zone is arranged downstream of the main wash zone/zones. It is also known to provide at least one post wash zone or pre-rinse zone also between the main wash zone and the final rinse zone.

When viewed in the conveying direction, the wash ware which is either accommodated directly on a conveyor belt or wash ware which is held by baskets usually runs through an inlet tunnel, the pre-wash zone(s) connecting thereto, main wash zone(s), post wash zone(s) which are provided where applicable, final rinse zone(s) and a drying zone into an outlet section.

Each of the named wash zones of the conveyor ware washer have associated therewith a wash system which comprises a wash pump and a line system which is connected to the wash pump and by means of which liquid is supplied to the spray nozzles of the wash zone. The wash liquid supplied to the spray nozzles is sprayed in the respective wash zone onto the wash ware which is conveyed by a conveying device of the conveyor ware washer through the respective wash zones. Each wash zone has associated therewith a wash tank in which sprayed liquid is accommodated and/or to which liquid for the spray nozzles of the relevant zone is supplied.

In the case of the conveyor ware washers which are usually known from the prior art, final rinse liquid in the form of fresh water, which can be pure or mixed with further additives, such as for example rinse aid, is sprayed onto the wash ware via the spray nozzles of the final rinse zone. At least part of the sprayed final rinse liquid is conveyed from zone to zone via a cascade system in opposition to the conveying direction of the wash ware.

The sprayed final rinse liquid is caught in a tank (post wash tank) of the post wash zone, from which it is conveyed via the wash pump of the wash system associated with the post wash zone to the spray nozzles (post wash nozzles) of the post wash zone. Wash liquid is rinsed off the wash ware in the post wash zone. The liquid accruing in this connection flows into the wash tank of the at least one main wash zone which, when viewed in the conveying direction of the wash ware, is connected upstream of the post wash zone. Here the liquid is usually provided with a detergent and is sprayed onto the wash ware via the nozzles (wash nozzles) of the main wash zone by means of a pump system which is associated with the wash system of the main wash zone. From the wash tank of the main wash zone the liquid then flows—in so far as no further main wash zone is provided—into the pre-wash tank of the pre-wash zone. The liquid in the pre-wash tank is sprayed onto the wash ware via the pre-wash nozzle of the pre-wash zone by means of a pump system associated with the wash system of the pre-wash zone in order to remove coarse contaminants from the wash ware.

In the area of industrial washing, there are several standards or guidelines in which the requirements with reference to the hygiene rating of cleaning processes and the procedure qualifications thereof are defined. With regard to the sovereign territory of the United States, the requirements with reference to the hygiene rating are defined in American Guideline/Standard NSF-ANSI-3-10. More detail in this respect is described in document "NSF/ANSI 3-2010 Commercial Warewashing Equipment" of the NSF International Standard/American National Standard, to which reference is made explicitly herein and which is also referred to below as "NSF guideline".

According to the NSF guideline, it is accordingly necessary in the case of industrial washing that thermal disinfection is effected during the cleaning process in so far as no chemical disinfection is provided. With regard to the thermal process "hot water sanitizing" defined in the NSF, minimum temperatures are required in the wash and rinse zones of the industrial warewasher. The result of this is that on account of the required high washing and rinsing temperatures when the industrial warewasher is operating, a relatively large amount of energy is consumed compared to conveyor ware washers which do not conform to NSF guidelines.

For example, an industrial conveyor ware washer which is based on the thermal disinfection defined in the NSF guideline and which has a ware capacity of approximately 6,500 plates per hour, requires approximately 90 kWh energy per hour running time. Of this approximately 31% of the energy is required to heat up the wash ware and to supply the thermal units required in the NSF guideline to the wash ware. Approximately 33% of the energy consumed in the operation of the conveyor ware washer is evaporation losses and is removed via air suction devices to the surrounding area or by means of site-side exhaust air systems. Approximately 21% of the energy is lost as sensible heat radiation over the outside surface of the machine, and approximately 15% of the energy is discharged by means of the waste water.

The object underlying the present invention is to develop further a conveyor ware washer of the type mentioned in the introduction to the effect that it is possible to save resources, in particular energy, when the machine is operating, although the conveyor ware washer is based on the principle of thermal disinfection and meets the hygiene ratings required in the NSF guideline.

Said object is achieved according to the invention by the object of independent claim 1, advantageous further developments of the conveyor ware washer according to the invention being provided in the dependent claims.

Accordingly, a conveyor ware washer of the type mentioned in the introduction is proposed, that is a conveyor ware washer which has at least two wash zones which are arranged one after the other when viewed in the conveying direction of the wash ware, as well as at least one final rinse zone which, when viewed in the conveying direction of the wash ware, is arranged downstream of the at least two wash zones, wherein the conveyor ware washer is additionally provided with an exhaust air system for removing exhaust air from the conveyor ware washer.

In order to be able to convert the thermal disinfection established in the NSF guideline, there is provided a heating device which is associated with that one of the at least two wash zones which, when viewed in the conveying direction of the wash ware, is arranged closer to the at least one final rinse zone. The heating device is realized (configured and/or arranged) for heating the wash liquid, which is to be sprayed in the relevant wash zone, to a previously established or establishable first minimum process temperature. Said previously established or establishable first minimum process temperature preferably corresponds to the minimum temperature of 71° C. prescribed in the NSF guideline.

In order, on the other hand, to be able to save resources, in particular energy, when the conveyor ware washer is operating, there is provided according to the invention a heat pump system which is realized for transmitting at least part of the thermal energy of the exhaust air, which has been removed or is to be removed from the conveyor ware washer, as useful heat to the wash liquid, which is to be sprayed in that wash zone of the at least two wash zones which, when viewed in the conveying direction of the wash ware, is arranged further away from the at least one final rinse zone.

The knowledge underlying the solution according to the invention is that the energy efficiency of the conveyor ware washer is able to be optimized when the evaporation losses are minimized. To this end, it is proposed to use the heat pump method in order to recover in an efficient manner at least part of the energy stored in the exhaust air to be removed from the conveyor ware washer. The exhaust air to be removed from the conveyor ware washer is a humid warm air flow which is guided according to the solution according to the invention via or through an evaporator of the heat pump system. In this case, the machine exhaust air is preferably cooled down to 18° C. at 100% relative air humidity.

As a result of transferring energy from the exhaust air to the refrigerating medium of the heat pump system, the refrigerating medium evaporates in the evaporator of the heat pump system. After full evaporation and superheating in the gaseous state, the refrigerating medium is then compressed in a heat pump compressor of the heat pump system and brought to a higher pressure and temperature level.

According to the solution according to the invention, on the high pressure side of the heat pump system the thermal energy, which was transferred beforehand from the machine exhaust air to the refrigerating medium, is output at least in part as useful energy to the wash liquid which is sprayed in that wash zone of the conveyor ware washer that is arranged further away from the at least one final rinse zone of the conveyor ware washer. In other words, the wash liquid, which is sprayed in the wash zone of the conveyor ware washer which, when viewed in the conveying direction of the wash ware, is arranged closer to the at least one final rinse zone of the conveyor ware washer, is not heated by means of the useful heat which is supplied by the heat pump system; rather an alternative heating device is used for heating the wash liquid which is to be sprayed in the relevant wash zone. With regard to the wash liquid, according to the present invention the heat pump method is only applied in the case of the wash zone(s) which do not directly adjoin the final rinse zone of the conveyor ware washer. In this connection, the thermal energy recovered from the exhaust air is output to the wash liquid as useful heat, the refrigerating medium of the heat pump system in this case condensing, liquefying and undercooling before it is relieved via an expansion valve of the heat pump system and a lower pressure level is achieved as a result.

By the heat pump method being used in the case of the conveyor ware washer according to the invention with the heat pump system, it is possible to suppress or to reduce the evaporation losses of the conveyor ware washer which are removed with the exhaust air, such that the exhaust air as a result is energetically neutral with regard to the room air of the installation room of the conveyor ware washer and as a result is able to be supplied directly to the installation room. Accordingly, the present invention makes it possible for the conveyor ware washer to be able to be used without a site-side exhaust air system as the exhaust air of the conveyor ware washer is able to be introduced directly into the installation room.

By, according to the solution according to the invention, the wash liquid, which is sprayed into that wash zone which, when viewed in the conveying direction of the wash ware, is arranged closer to the at least one final rinse zone, not being heated to the minimum process temperature required in the NSF guideline by means of the heat pump method but by means of an (alternative) heating device, it is possible, in particular, for the heat pump system, which is used in the case of the conveyor ware washer according to the invention, to be able to be operated with chlorine-free refrigerating media available today. Chlorine-free refrigerating media for stationary refrigerating plants known from the prior art are, for example, R134a, R404A, R407A and R410A.

The disadvantage of currently available chlorine-free refrigerating media for stationary refrigerating plants, however, is that said refrigerating media are only usable in a restricted manner, the restriction relating above all to the high pressure side of the refrigerating plant. Refrigerating medium R134a which is currently the most used should not be used for example at pressures in excess of 25 bar as commercially available parts and components can no longer be used within said ranges. On the other hand, a pressure of 25 bar on the high pressure side of the heat pump system corresponds to a condensation temperature of approximately 75° C. As, at a condensation temperature of the refrigerating medium of approximately 75° C., it is only possible theoretically to reach the first minimum process temperature of at least 71° C. required in the NSF guideline for the wash fluid, according to the solution according to the invention the heating of the wash liquid to the first minimum process temperature is effected by way of a heating device that is alternative to the heat pump method.

Accordingly, the solution according to the invention supplies not only the advantage that, in the case of a conveyor ware washer which meets the requirements established in the NSF guideline with regard to thermal disinfection, not only can up to 33% energy be saved in a manner that is easy to realize but is nevertheless effective, but also the advantage that the conveyor ware washer can be operated without a site-side exhaust air system. Over and above this, in the case of the heat pump system used, recourse can be made to currently available chlorine-free refrigerating media and to commercially available components for use in refrigerating plant technology for pressure ranges of up to 25 bar.

According to a preferred realization of the conveyor ware washer according to the invention, the heat pump system used there comprises an evaporator for transmitting at least part of the thermal energy of the exhaust air, which has been removed or is to be removed from the conveyor ware washer, to the refrigerating medium of the heat pump system. In detail, it is preferred to arrange the evaporator of the heat pump system in the machine-side exhaust air system or at the output thereof such that it can be reached on all sides in a suitable manner by the flow of exhaust air to be removed from the conveyor ware washer. Consequently, the machine exhaust air can be cooled from originally, for example, 45° C. to approximately 18° at relative 100% humidity, the refrigerating medium of the heat pump system evaporating in the evaporator at the same time. The thermal energy, which is transmitted in such a manner to the refrigerating medium, can then be used by means of at least one heat exchanger as useful heat for heating, in particular, process liquids in the conveyor ware washer.

A first heat exchanger, which is arranged in the wash zone or in the wash tank of that wash zone which, when viewed in the conveying direction of the wash ware, is arranged further from the at least one final rinse zone of the conveyor ware washer, is used for this purpose according to a preferred embodiment of the present invention.

The solution according to the invention, however, is not restricted to embodiments in which the heat pump method is used solely and exclusively for heating the wash liquid which is to be sprayed in that wash zone which, when viewed in the conveying direction of the wash ware, is arranged further away from the at least one final rinse zone of the conveyor wash ware. Rather, it is additionally conceivable to use the useful heat that is available by way of the heat pump system also for heating the final rinse liquid to be sprayed in the at least one final rinse zone and/or for heating the drying air in a drying zone which is arranged, when viewed in the conveying direction of the conveyor ware washer, downstream of the at least one final rinse zone.

Thus, in a preferred realization of the conveyor ware washer with regard to the pre-heating of the final rinse liquid to be sprayed in the at least one final rinse zone by means of the heat pump method, a plurality of heat exchangers is used which are connected in series and by way of which in each case useful heat is transmitted from the refrigerating medium of the heat pump system to the final rinse liquid to be sprayed.

On the other hand, it is obviously also conceivable, in addition to this or as an alternative to this, to pre-heat the final rinse liquid to be sprayed in the at least one final rinse zone by way of a "classic" heat transmitting system which is arranged in the hot exhaust air flow of the conveyor ware washer. A classic heat transmitter or heat transmitter system is to be understood herein as a heat exchanger which is arranged in the humid, warm exhaust air of the conveyor ware washer and is not reached on all sides by a refrigerating medium in terms of the heat pump method, but by a process liquid of the conveyor ware washer, in particular the final rinse liquid in order to pre-heat the process liquid.

The heating devices which are used in the case of the conveyor ware washer according to the invention and are used as an alternative to the heat pump method, are preferably heating devices where, by means of electric energy, steam, gas or hot water, the respective process liquid (wash liquid or final rinse liquid) is raised to the necessary minimum process temperature established in the NSF guideline.

Exemplary embodiments of the conveyor ware washer according to the invention are described below with reference to the accompanying drawings, in which.

Figure 1:
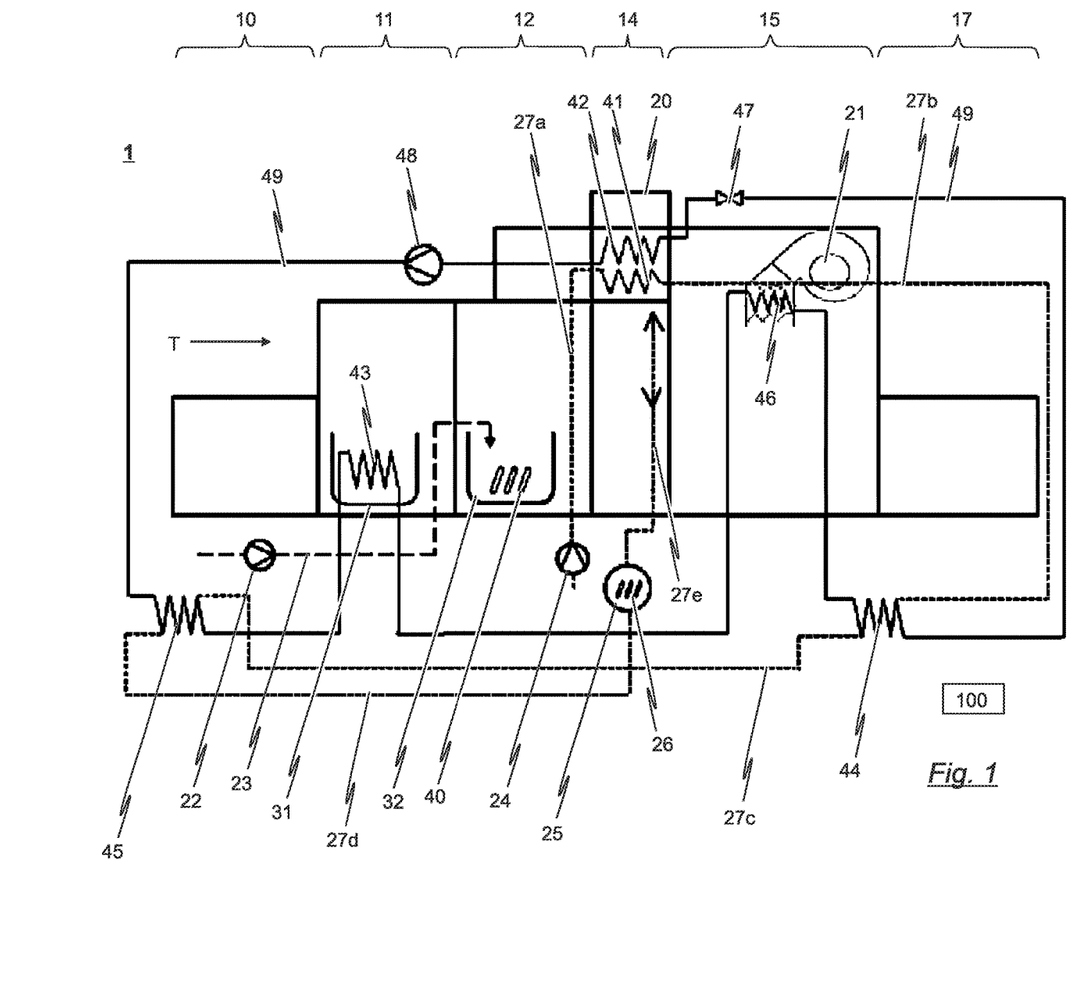
FIG. 1: shows a schematic view of a first exemplary embodiment of the conveyor ware washer according to the invention.

As an example of the solution according to the invention, FIG. 1 shows a schematic longitudinal sectional view of a conveyor ware washer 1. The conveyor ware washer 1 according to the representation in FIG. 1 is a so-called single tank conveyor within the meaning of the terminology used in the NSF guideline.

It must be pointed out at this point that according to the terminology of the NSF guideline in the case of single tank conveyors possible pre-wash zones are not counted as wash zones and are consequently not included. Accordingly, a conveyor ware washer with a pre-wash zone and a main wash zone is a single tank machine according to the NSF guideline.

Accordingly, the conveyor ware washer 1 comprises a pre-wash zone 11 as well as a main wash zone 12 which, when viewed in the conveying direction T of the wash ware, is arranged downstream of the pre-wash zone 11. In the case of the conveyor ware washer 1 shown in FIG. 1, a final rinse zone 14 is arranged downstream of the main wash zone 12 when viewed in the conveying direction T.

The wash ware, which is either received directly on a conveyor belt or wash ware which is held by means of baskets, when seen in the conveying direction T, runs through an inlet tunnel 10, the pre-wash zone 11 which connects thereto, the main wash zone 12, the final rinse zone 14, and through a drying zone 15 into an outlet section 17.

Spray nozzles, by means of which liquid is sprayed onto the wash ware which is conveyed by the conveyor belt through the respective treatment zones 11, 12, 14, are associated with the named treatment zones 11, 12 and 14 of the conveyor ware washer 1.

Although not shown in the drawings, it is preferred when the spray nozzles of the wash system associated with the pre-wash zone 11 and the main wash zone 12 are realized in each case in an upper and lower wash tube such that corresponding wash arms are used in said treatment zones 11, 12. It is conceivable in this connection for the wash systems used to comprise a plurality of wash tubes which form a wash arm battery, the plurality of wash tubes being connected to a corresponding wash pump by means of a preferably common line system.

As indicated in FIG. 1, each wash zone (pre-wash zone 11, main wash zone 12) has associated therewith a tank (wash tank 31, 32) in which sprayed liquid is accommodated, and/or in which liquid for the spray nozzles of the relevant zones 11, 12 is supplied.

The term "wash zone" used here is basically to be understood as a treatment zone which has associated therewith a circulation tank (wash tank) and in which the liquid collected in the circulation tank of the treatment zone is circulated by means of a wash pump which is associated with the treatment zone. The term "wash zone" consequently includes the pre-wash zone 11, the main wash zone 12 but also a post wash zone (13) (cf. FIG. 2) which, where applicable, is connected downstream of the main wash zone 12 when viewed in the conveying direction T of the wash ware. The post wash zone 13 (cf. FIG. 2) is also designated on occasion in industrial washing as a "pump final rinse zone" or a "pre-rinse zone". In this connection this is a circulating final rinse which is connected upstream of the fresh water final rinse.

In contrast, the term "final rinse zone" used herein is to be understood as a zone in which a fresh water final rinse takes place where the wash ware is sprayed with fresh water, which, where applicable, is mixed with rinse aid in order to rid the wash ware completely of dirt particles and detergent solution. Consequently, the last rinse before drying takes place in the final rinse zone.

Although not shown in the drawings, the pre-wash zone 11 and the main wash zone 12 of the conveyor ware washer 1 according to the embodiment shown schematically in FIG. 1 accordingly comprise in each case a wash system which is assembled from a wash pump, a line system which is connected to the wash pump and the spray nozzles which are connected to the line system in order to spray from the corresponding tank 31, 32 the wash liquid collected there onto the wash ware.

Provided in addition is a control device 100, which (among other things) serves for the purpose of actuating the respective wash pumps of the wash systems in a suitable manner during a wash or cleaning process in order to supply liquid at least sometimes to the spray nozzles of the nozzle system associated with the respective wash system via the associated line system.

In detail, in the case of the conveyor ware washer 1 shown in FIG. 1, final rinse liquid in the form of fresh water which can be mixed with further additives, such as for example rinse aid, is sprayed onto the wash ware, not shown in FIG. 1, by means of the spray nozzles of the final rinse zone which are arranged above and below the conveyor belt. In this connection, it is obviously also conceivable for spray nozzles which are arranged at the side also to be able to be provided in the final rinse zone 14.

At least part of the final rinse liquid sprayed in the final rinse zone 14 is conveyed from zone to zone in opposition to the conveying direction T of the wash ware by means of a cascade system.

Although not shown in FIG. 1, it is conceivable to provide a bypass line from the final rinse zone 14 to the pre-wash tank 31 in order, where required, to direct at least part of the final rinse liquid sprayed in the final rinse zone 14 directly into the pre-wash tank 31.

The final rinse liquid sprayed in the final rinse zone 14 is collected in the tank (main wash tank 32) of the main wash zone 12, usually provided with a detergent and is sprayed onto the wash ware by means of a wash pump associated with the main wash zone 12 via the spray nozzles (wash nozzles) of the wash system associated with the main wash zone 12. As shown schematically in FIG. 1, a detergent dosing pump 22, the pressure side of which, as regards fluid, is connected or connectable to the main wash tank 32 by means of a detergent feed line 23, and which is actuatable in a suitable manner by the control device 100, is used for adding detergent into the wash liquid collected in the main wash tank 32 of the main wash zone 12.

The liquid then flows from the wash tank 32 of the main wash zone 12 into the pre-wash tank 31 of the pre-wash zone 11. The liquid in the pre-wash tank 31 is sprayed by means of a wash pump associated with the pre-wash zone 11 via the spray nozzles (pre-wash nozzles) of the pre-wash zone onto the wash ware in order to remove coarse contaminants from the wash ware.

Although not shown in FIG. 1, it is conceivable to separate the respective treatment zones in the conveyor ware washer 1 from one another by means of curtains, said curtains serving for the purpose of preventing liquid being over-sprayed in particular in the wash operation of the conveyor ware washer 1. Corresponding curtains can also be provided at the inlet and at the outlet of the conveyor ware washer in order to prevent vapors escaping from the conveyor ware washer 1.

The drying zone 15 is arranged downstream of the final rinse zone 14 (the only one in FIG. 1) in the conveying direction T. The drying zone 15 has associated therewith a corresponding blower 21 in order to circulate hot air around the already cleaned wash ware and as a result to dry it.

The heat pump concept used in the case of the exemplary embodiment of the conveyor ware washer 1 shown schematically in FIG. 1 will be described in more detail below. As already indicated in the general part of the description, the heat pump concept according to the invention for conveyor ware washers with NSF requirements (or NSF process temperatures) serves in particular for energy recovery and for dispensing with site-based exhaust air extraction installations.

According to the NSF guidelines for thermal disinfection, in the case of a conveyor ware washer that is realized as a single tank conveyor, that is a conveyor ware washer as shown schematically in FIG. 1, the wash liquid in the main wash zone 12 has to be at a minimum process temperature of at least 71° C. (=160° F.). According to the NSF guideline, the minimum process temperature of the final rinse liquid to be sprayed in the final rinse zone 14 must be at least 82° C. (=180° F.). No minimum process temperature is established in the NSF guidelines for the pre-wash zone 11 and the drying zone 15.

In order to be able to realize said minimum process temperatures established in the NSF guideline, it is provided in the case of the solution shown schematically in FIG. 1 that the wash liquid to be sprayed in the pre-wash zone 11 is heated purely by the useful heat which can be supplied by a heat pump system and is recovered from the machine exhaust air, whilst the wash liquid to be sprayed in the main wash zone 12 is heated in an alternative manner and brought to the minimum process temperature of 71° C. A heating device 40, which is based on an alternative principle compared to the heat pump method and, for example, can comprise an electric heating means 40, is used for this purpose.

As an alternative to this or in addition to it, however, it is obviously also conceivable for the (alternative) heating device 40 associated with the main wash zone 12 to be realized to heat the wash liquid in the wash tank 32 of the main wash zone 12 to the minimum process temperature required in the NSF guideline by way of steam, gas or hot water.

In order to heat the final rinse liquid (fresh water with, where applicable, added rinse aid) to be sprayed in the final rinse zone 14 to the minimum process temperature of 82° C. required in the NSF guideline, according to the embodiment shown schematically in FIG. 1, first of all pre-heating takes place by means of a "classic" heat transmitter 41, which is arranged in the machine-side exhaust air system 20 and during the operation of the conveyor ware washer 1 is flowed under by the moist and hot exhaust air of the conveyor ware washer 1. At least part of the thermal energy contained in the moist, hot exhaust air, in this case, is transmitted by means of the heat transmitter 41 to the fresh water to be sprayed in the final rinse zone 14.

For this purpose, the inlet of the heat transmitter 41 is connected to a final rinse liquid pump 24 by means of a final rinse liquid line system 27a. In place of a final rinse liquid pump 24, it is obviously also conceivable, as regards the flow, to connect the final rinse liquid line system 27a directly to the fresh water connection of the conveyor ware washer 1.

The final rinse liquid is heated in the heat transmitter 41 from originally, for example, 15° C. to approximately 45° C. (depending on the design of the heat transmitter 41). The final rinse liquid, which is pre-heated in this manner, is supplied by means of the final rinse liquid line system 27b to a heat exchanger system 44, 45 in which at least part of the useful heat which can be supplied by the heat pump system is used for further heating of the final rinse liquid. A total of two heat exchangers 44, 45, in which useful heat is transmitted from the refrigerating medium of the heat pump system to the final rinse liquid to be sprayed in the final rinse zone 14, are used for the further heating of the final rinse liquid in the embodiment shown schematically in FIG. 1. The final rinse liquid can be heated to approximately 70° C. in this manner.

In order to achieve the minimum process temperature of 82° C. for the final rinse liquid required by the NSF guidelines, the final rinse liquid is then further heated to the named 82° C. in a final rinse liquid heater 25. An alternative heating device 26 to the heat pump system which is, for example, an electric heating means, is used for this purpose.

The heat pump system in the case of the embodiment shown in FIG. 1 comprises an evaporator 42 which—as indicated schematically in FIG. 1—is arranged together with the heat transmitter 41 in the machine-side exhaust air system 20 or at the outlet of the machine-side exhaust air system 20. The refrigerating medium of the heat pump system evaporates in the evaporator 42 when the evaporator 42 is reached on all sides by the moist, hot air of the conveyor ware washer 1.

In this way and, where applicable, in cooperation with the heat transmitter 41, the machine exhaust air can be cooled from its original, for example, 45° C. to room temperature or approximately 18° C. at 100% relative air humidity such that the machine exhaust air can then be introduced directly into the installation room of the conveyor ware washer 1 and, in particular, a site-side exhaust air system is no longer necessary.

The refrigerating medium evaporated in the evaporator 42 of the heat pump system, after full evaporation and overheating in the gaseous state, is compressed by a heat pump compressor 48 and is thus brought to a higher pressure and temperature level. On the high pressure side of the compressor 48, the thermal energy which has been removed beforehand from the moist, hot exhaust air is then output as useful heat or heat output to the final rinse liquid to be sprayed in the final rinse zone 14 or to the wash liquid to be sprayed in the pre-wash zone 11.

A first heat exchanger 43, which is incorporated in the wash tank 31 of the pre-wash zone 11 and is flowed through by the refrigerating medium of the heat pump system, is used for this purpose such that useful heat is transmitted from the refrigerating medium to the wash liquid to be sprayed in the pre-wash zone 11.

A second and third heat exchanger 44, 45, which—as already stated—serve for the purpose of transmitting useful heat from the refrigerating medium to the final rinse liquid to be sprayed in the final rise zone 14, are also provided in series with the first heat exchanger 43.

In addition, a heat exchanger 46 is provided in the drying zone 15 in order to be able to utilize the useful heat that can be supplied by the heat pump system for heating the drying air in the drying zone 15.

When passing through the individual heat exchangers 43, 44, 45, 46, the refrigerating medium condenses, liquefies and undercools before it is relieved via an expansion valve 47 and a lower pressure level is achieved as a result.

Using said heat pump system or heat pump concept, it is possible for a pressure value of 25 bar not to be exceeded on the high pressure side of the heat pump system such that recourse can be made to commercially available parts and components. At the same time, chlorine-free refrigerating media that are available today are suitable as refrigerating media.

Although not shown in FIG. 1, it is obviously conceivable for yet another (alternative) heating device to be associated, additionally, with the first heat exchanger 43 of the heat pump system of the pre-wash zone 11, this being, in particular, an electrically operated heating device or an additional heating device that is operated with steam or gas and is realized independently of the heat pump system. By way of said additional (alternative) heating device, the wash liquid to be sprayed in the pre-wash zone 11 can be supplied, where required and independently of the heat pump system, with thermal energy in order to achieve that the wash liquid to be sprayed in the pre-wash zone 11 is always at a previously established or establishable minimum process temperature of, for example, at least 66° C.

According to one aspect of the present invention, said additional (alternative) heating device serves as an emergency heating unit which always supplies thermal energy to the wash liquid to be sprayed in the pre-wash zone 11 whenever the thermal energy supplied by way of the heat pump system and the first heat exchanger 43 is not sufficient to heat the wash liquid to be sprayed in the pre-wash zone 11 to the previously established or establishable process temperature of, for example, 66° C. In this connection, it would be conceivable for the temperature of the wash liquid in the pre-wash tank 31 to be determined, in particular measured, continuously or at predefined times or events, and for the additional (alternative) heating device always to be activated whenever the determined temperature does not reach the previously established minimum process temperature.

Providing an additional (alternative) heating device preferably in the pre-wash tank 31 of the pre-wash zone 11 consequently ensures that in the event of a fault in the heat pump system, the process temperature of the wash liquid to be sprayed in the pre-wash zone 11 is at the previously established minimum value of, for example, 66° C.

A further exemplary embodiment of the conveyor ware washer 1 according to the invention is described below with reference to the representation in FIG. 2.

Figure 2:
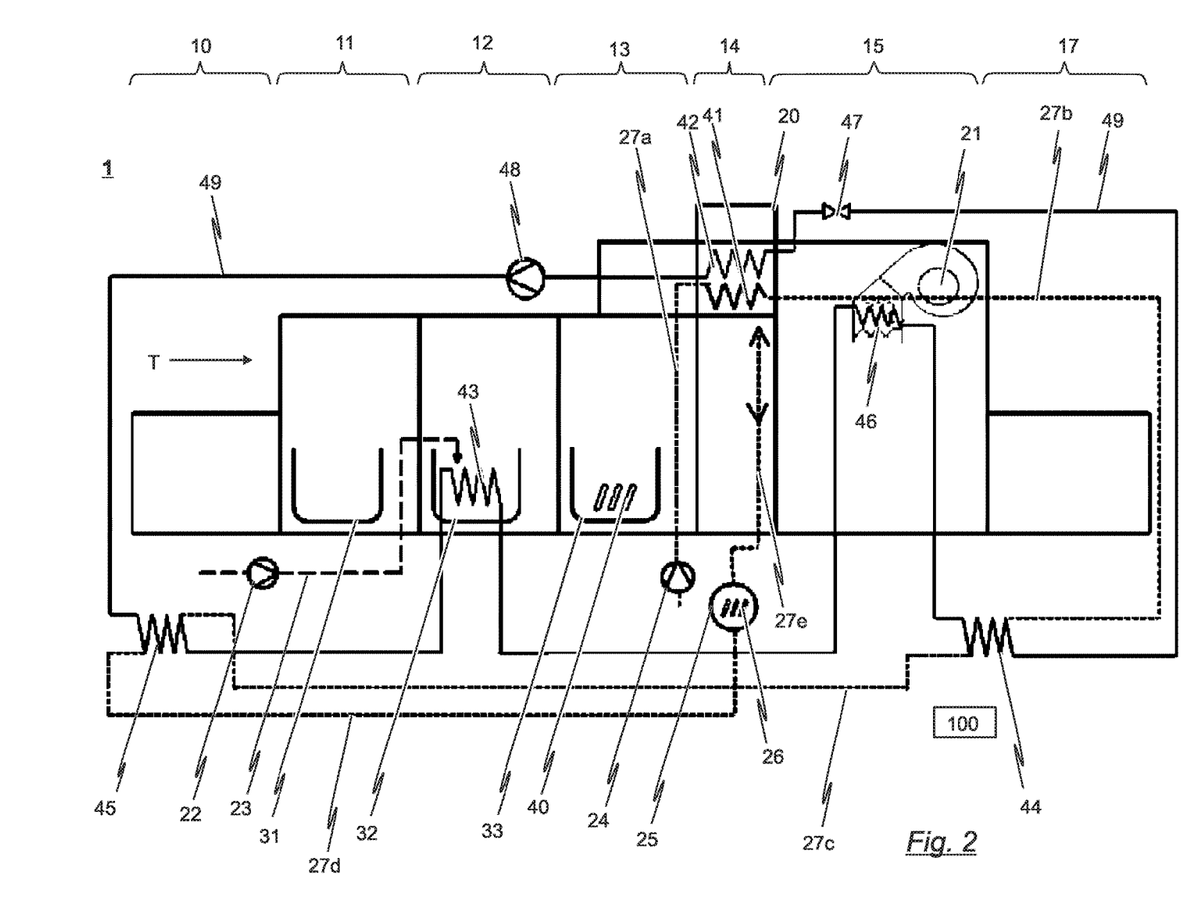
FIG. 2: shows a schematic view of a second exemplary embodiment of the conveyor ware washer according to the invention.

In contrast to the single tank conveyor ware washer shown in FIG. 1 and described beforehand, the conveyor ware washer 1 shown in FIG. 2 is a so-called multiple tank conveyor in the terminology of the NSF guideline. These are conveyor ware washers where yet another further wash zone 13 is arranged between the main wash zone 12 and the final rinse zone 14. Said further wash zone 13 is frequently also designated in the NSF guideline as a pumped rinse zone which is a wash zone in which no detergent is actively added.

According to the NSF guidelines, in the case of a multiple tank conveyor the wash liquid sprayed in the further wash zone 13 has to be at a minimum process temperature of 71° C. (=160° F.), the wash liquid to be sprayed in the main wash zone 12 having to be at a minimum process temperature of 66° C. (=150° F.). In the final rinse zone 14, the final rinse liquid to be sprayed there has to be at a minimum process temperature of 82° C. (=180° F.). No minimum process temperatures are specified in the NSF guideline for the drying zone 15 and the pre-wash zone 11.

Similarly as also in the case of the previously described first embodiment, in the case of the multiple tank conveyor ware washer 1 shown schematically in FIG. 2 the final rinse liquid to be sprayed in the final rinse zone 14 is heated in part by means of the useful heat that is supplied by the heat pump system, the required minimum process temperature then being achieved by way of an alternative heating device 26.

The minimum process temperature to be set in the further wash zone 13 for the wash liquid to be sprayed there is achieved according to the solution according to the invention purely by an alternative heating device 40. In the case of the embodiment shown in FIG. 2, the wash liquid to be sprayed in the main wash zone 12 is heated only by means of the useful heat supplied by the heat pump system.

In the light of the foregoing, it is clearly demonstrated that the heat pump concept according to the invention is distinguished in that that wash zone which, when viewed in the conveying direction T of the wash ware, is arranged closest to the final rinse zone 14 is heated by way of an alternative heating device to the minimum process temperature required in the NSF guideline, the wash zone arranged further away from the final rinse zone 14 being brought to the required minimum process temperature just by the useful heat of the heat pump system.

In other words, at least one of the at least two wash tanks 31, 32, 33 is heated by way of the useful heat that is supplied by the heat pump system, that wash tank in which the higher minimum process temperature is to be set being heated by means of an alternative heating method, such as, for example, in an electrical manner, steam, gas or hot water.

This is synonymous with all consumers of the conveyor ware washer 1 where the process temperature is less than 71° C. being heated by means of the heat pump system, whilst all the remaining consumers are heated by alternative heating media.

As already stated in conjunction with the first embodiment shown in FIG. 1, it is additionally conceivable in the case of the embodiment shown in FIG. 2 for yet another (alternative) heating device to be associated in addition with the first heat exchanger 43 of the heat pump system of the main wash zone 12, this being in particular an electrically operated heating device or an additional heating device operated with steam or gas which is realized independently of the heat pump system. By way of said additional (alternative) heating device, the wash liquid to be sprayed in the main wash zone 12 can be supplied with thermal energy where required and independently of the heat pump system in order to achieve that the wash liquid to be sprayed in the main wash zone 12 is always at a previously established or establishable minimum process temperature of, for example, at least 66° C.

According to one aspect of the present invention, said additional (alternative) heating device serves as an emergency heating unit which always supplies thermal energy to the wash liquid to be sprayed in the main wash zone 12 whenever the thermal energy supplied by way of the heat pump system and the first heat exchanger 43 is not sufficient to heat the wash liquid to be sprayed in the main wash zone 12 to the previously established or establishable process temperature of, for example, 66° C.

In this connection, it would be conceivable for the temperature of the wash liquid in the main wash tank 32 to be determined, in particular measured, continuously or at predefined times or events, and for the additional (alternative) heating device always to be activated whenever the determined temperature does not reach the previously established minimum process temperature.

Providing an additional (alternative) heating device preferably in the main wash tank 32 of the main wash zone 12 consequently ensures that in the event of a fault in the heat pump system the process temperature of the wash liquid to be sprayed in the main wash zone 12 is at the previously established minimum value of, for example, 66° C.

The invention is not restricted to the embodiments shown as an example in the drawings, but is produced from an overview of all the features disclosed herein.

In particular, it is conceivable for the process temperatures of the process liquids to be determined preferably continuously or at predefined times/events by means of temperature sensors and to be supplied to the control device 100 such that the control device 100 can then actuate the corresponding (alternative) heating devices 26, 40 and/or the actuatable components of the heat pump system in order to ensure that the process temperatures lie within a previously established range.

LIST OF REFERENCES

1 Conveyor ware washer
10 Inlet tunnel
11 First wash zone (pre-wash zone)
12 Second wash zone (main wash zone)
13 Third (further) wash zone (post-wash zone)
14 Final rinse zone
15 Drying zone
16 Outlet of the conveyor ware washer
20 Conveyor-side exhaust air system
21 Blower of the drying zone
22 Detergent dosing pump
23 Detergent feed line
24 Final rinse liquid pump
25 Final rinse liquid heater (boiler)
26 Alternative heating device for final rise liquid
27a to 27e Final rinse liquid line system
31 Wash tank of the pre-wash zone (pre-wash tank)
32 Wash tank of the main wash zone (main wash tank)
33 Wash tank of the further wash zone
40 Alternative heating device for wash liquid
41 Heat transmitter or heat transmitter system
42 Evaporator of the heat pump system
43 First heat exchanger of the heat pump system 44 Second heat exchanger of the heat pump system
45 Third heat exchanger of the heat pump system
46 Fourth heat exchanger of the heat pump system
47 Expansion valve
48 Compressor of the heat pump system
49 Refrigerating medium line
100 Control device
T Conveying direction

The invention claimed is:

1. Conveyor ware washer having a conveying device for conveying wash ware in a conveying direction through treatment zones of the conveyor ware washer, wherein the conveyor ware washer has at least two wash zones that are arranged one after the other when viewed in the conveying direction and in each wash zone wash liquid from a wash tank associated with the wash zone is sprayed onto the wash ware, wherein the conveyor ware washer has at least one final rinse zone which, when viewed in the conveying direction, is arranged downstream of the at least two wash zones, in which final rinse zone fresh water is sprayed onto the wash ware, wherein the conveyor ware washer has a drying zone that is located downstream of the final rinse zone in the conveying direction, and wherein the conveyor ware washer additionally has an exhaust air system for removing exhaust air from the conveyor ware washer, characterized in that
  a downstream wash zone of the at least two wash zones which, when viewed in the conveying direction, is arranged closer to the at least one final rinse zone, has associated therewith a first heating device that is arranged for heating the wash liquid, which is to be sprayed in the downstream wash zone, to a previously established or establishable first minimum process temperature, and
  in that, in addition, a heat pump system is provided for transmitting at least some thermal energy of the exhaust air, which has been removed or is to be removed from the conveyor ware washer, as useful heat to the wash liquid, which is to be sprayed in an upstream wash zone of the at least two wash zones which, when viewed in the conveying direction, is arranged further away from the at least one final rinse zone;
  wherein the heat pump system includes a compressor and an evaporator located along a path of a refrigerating medium of the heat pump system, wherein the evaporator is positioned for transmitting at least part of the thermal energy of the exhaust air to the refrigerating medium of the heat pump system, and the path includes, in order along the path between the compressor and the evaporator in a direction of refrigerating medium flow, a first heat exchanging condenser, a second heat exchanging condenser, a third heat exchanging condenser and a fourth heat exchanging condenser;
  wherein the at least one final rinse zone has associated therewith a second heating device for heating the fresh water, which is to be sprayed in the at least one final rinse zone;
  wherein:
    the first heat exchanging condenser is arranged for transmitting part of the thermal energy of the exhaust air to the fresh water which is to be sprayed in the at least one final rinse zone for preheating the fresh water before the fresh water reaches the second heating device;
    the second heat exchanging condenser is arranged for transmitting part of the thermal energy of the exhaust air to the wash liquid of the upstream wash zone;
    the third heat exchanging condenser is arranged for transmitting part of the thermal energy of the exhaust air to drying air in the drying zone; and
    the fourth heat exchanging condenser is arranged for transmitting part of the thermal energy of the exhaust air to the fresh water which is to be sprayed in the at least one final rinse zone, in advance of the fresh water being preheated by the first heat exchanging condenser.

2. Conveyor ware washer as claimed in claim 1, wherein the first heating device is arranged to introduce thermal energy, which has not been recovered from the exhaust air, into the wash liquid to be sprayed in the downstream wash zone.

3. Conveyor ware washer as claimed in claim 2, wherein the first heating device is arranged to heat the wash liquid to the first minimum process temperature by way of electric energy, steam, gas or hot water.

4. Conveyor ware washer as claimed in claim 1, wherein the heat exchanging condenser is arranged to heat the wash liquid, which is to be sprayed in the upstream wash zone, to a previously established or establishable second minimum process temperature.

5. Conveyor ware washer as claimed in claim 4, wherein the second heating device is configured for heating the fresh water, which is to be sprayed in the at least one final rinse zone, to a previously established or establishable third minimum process temperature.

6. Conveyor ware washer as claimed in claim 1, wherein, in addition, there is provided a heat transmitting system for transmitting at least part of the thermal energy of the exhaust air to the fresh water which is to be sprayed in the at least one final rinse zone.

7. Conveyor ware washer as claimed in claim 6, wherein the heat transmitting system is arranged upstream of the fourth heat exchanging condenser, along a flow path of the fresh water, and is realized for preheating the fresh water which is to be sprayed in the at least one final rinse zone, to a temperature within a range of between 40° C. and 50° C.

8. Conveyor ware washer as claimed in claim 7, wherein the second heating device is arranged to introduce thermal energy, which has not been recovered from the exhaust air, into the fresh water which is to be sprayed in the at least one final rinse zone, said thermal energy not having been recovered from the exhaust air which has been removed or is to be removed from the conveyor ware washer.

9. Conveyor ware washer as claimed in claim 8, wherein the second heating device is arranged to heat the fresh water by way of electric energy, steam, gas or hot water.

10. Conveyor ware washer as claimed in claim 7, wherein the fourth heat exchanging condenser is arranged to heat further the fresh water which is preheated in the heat transmitting system to a temperature within a range of between 55° C. and 65° C.

11. Conveyor ware washer as claimed in claim 1, wherein the conveyor ware washer has at least three wash zones which, when viewed in the conveying direction, are arranged one after the other and are connected upstream of the at least one final rinse zone, wherein each of the at least three wash zones has a correspondingly associated wash tank for receiving wash liquid which is to be sprayed in the corresponding wash zone.

12. Conveyor ware washer as claimed in claim 11, wherein in a most upstream wash zone of the at least three wash zones, which is arranged the furthest away from the at least one final rinse zone, the wash liquid is sprayed without being heated further.

13. A conveyor ware washer, comprising:
a conveying device for conveying wash ware in a conveying direction through the conveyor ware washer, wherein the conveyor ware washer has a first wash zone and a second wash zone, the second wash zone downstream of the first wash zone in the conveying direction, the first wash zone including an associated first wash tank for holding wash liquid to be sprayed in the first wash zone, the second wash zone including an associated second wash tank for holding wash liquid to be sprayed in the second wash zone, wherein the second wash zone has associated therewith a first heating device that is arranged for heating the wash liquid, which is to be sprayed in the second wash zone,
wherein the conveyor ware washer has a final rinse zone located downstream of the second wash zone in the conveying direction, in which final rinse zone fresh water is sprayed onto the wash ware, wherein the final rinse zone has associated therewith a second heating device for heating the fresh water, which is to be sprayed in the at least one final rinse zone;
wherein the conveyor ware washer has a drying zone located downstream of the final rinse zone in the conveying direction,
wherein the conveyor ware washer includes an exhaust air system for removing exhaust air from the conveyor ware washer,
wherein the conveyor ware washer has a heat pump system including a compressor and an evaporator located along a path of a refrigerating medium of the heat pump system, wherein the evaporator is positioned for transmitting at least some thermal energy of the exhaust air to the refrigerating medium of the heat pump system, and the path includes, in order along the path between the compressor and the evaporator in a direction of refrigerating medium flow, a first heat exchanging condenser, a second heat exchanging condenser, a third heat exchanging condenser and a fourth heat exchanging condenser;
wherein the first heat exchanging condenser is arranged for transmitting part of the thermal energy of the exhaust air from the refrigerating medium to the fresh water which is to be sprayed in the at least one final rinse zone for preheating the fresh water before the fresh water reaches the second heating device;
wherein the second heat exchanging condenser is arranged for transmitting part of the thermal energy of the exhaust air from the refrigerating medium to the wash liquid of the upstream wash zone;
wherein the third heat exchanging condenser is arranged for transmitting part of the thermal energy of the exhaust air from the refrigerating medium to drying air in the drying zone; and
wherein the fourth heat exchanging condenser is arranged for transmitting part of the thermal energy of the exhaust air from the refrigerating medium to the fresh water which is to be sprayed in the at least one final rinse zone, in advance of the fresh water being preheated by the first heat exchanging condenser.

\* \* \* \* \*